US012756924B2

(12) United States Patent
Kogo

(10) Patent No.: US 12,756,924 B2
(45) Date of Patent: Oct. 6, 2026

(54) CONTROL DEVICE, PROCESSING METHOD, AND STORAGE MEDIUM

(71) Applicant: NEC Corporation, Tokyo (JP)

(72) Inventor: Takuma Kogo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 75 days.

(21) Appl. No.: 18/696,400

(22) PCT Filed: Oct. 7, 2021

(86) PCT No.: PCT/JP2021/037221
§ 371 (c)(1),
(2) Date: Mar. 28, 2024

(87) PCT Pub. No.: WO2023/058204
PCT Pub. Date: Apr. 13, 2023

(65) Prior Publication Data

US 2024/0397193 A1 Nov. 28, 2024

(51) Int. Cl.
*H04N 23/62* (2023.01)
*H04N 23/66* (2023.01)

(52) U.S. Cl.
CPC ............. *H04N 23/62* (2023.01); *H04N 23/66* (2023.01)

(58) Field of Classification Search
CPC ....... G06F 3/0484; H04N 23/66; H04N 23/62
USPC ....................................................... 348/211.8
See application file for complete search history.

(56) References Cited

U.S. PATENT DOCUMENTS 8,577,210 B2 * 11/2013 Kashima ................ G11B 27/34 386/278
9,031,389 B2 * 5/2015 Kashima ............... G06F 3/0482 386/278
10,129,481 B2 * 11/2018 Mukherjee ............. H04N 23/63
10,430,027 B2 * 10/2019 Kurisu ...................... G09G 5/00
10,444,968 B2 * 10/2019 Yoshinaka .......... G06F 3/04847
10,666,869 B2 * 5/2020 Mukherjee ........... H04N 23/632
2002/0067412 A1 * 6/2002 Kawai .................. H04N 23/631 348/E7.086
2009/0249210 A1 * 10/2009 Sheldon ................ G06F 1/3231 715/730
2011/0026901 A1 * 2/2011 Kashima ................ G11B 27/34 386/E5.028
2012/0079416 A1 * 3/2012 Fagans ................ G06F 3/04845 715/838
2012/0306928 A1 * 12/2012 Yoshinaka .......... G06F 3/04847 345/660
2013/0016122 A1 * 1/2013 Bhatt ........................ G06T 3/40 345/620

(Continued)

FOREIGN PATENT DOCUMENTS

JP H08-154197 A 6/1996
JP 2018-200654 A 12/2018

(Continued)

OTHER PUBLICATIONS

International Search Report for PCT Application No. PCT/JP2021/037221, mailed on Jan. 11, 2022.

*Primary Examiner* — Pritham D Prabhakher
(74) *Attorney, Agent, or Firm* — Sughrue Mion, PLLC

(57) ABSTRACT

Multiple items of information associated with a state of a control target are displayed. An image relating to the control target in the state is displayed based on selection of one item of information among the multiple items of information.

8 Claims, 9 Drawing Sheets

(56) References Cited

U.S. PATENT DOCUMENTS

| | | | | |
|---|---|---|---|---|
| 2016/0073034 | A1* | 3/2016 | Mukherjee | H04N 23/63 348/333.11 |
| 2017/0192630 | A1* | 7/2017 | Kurisu | G09G 5/00 |
| 2018/0225035 | A1* | 8/2018 | Yoshinaka | G06F 3/04847 |
| 2019/0045130 | A1* | 2/2019 | Mukherjee | H04N 23/62 |
| 2019/0320108 | A1* | 10/2019 | Kim | H04N 5/93 |

FOREIGN PATENT DOCUMENTS

| | | | |
|---|---|---|---|
| JP | 2020-005146 | A | 1/2020 |
| WO | 2016/067391 | A1 | 5/2016 |
| WO | 2017/159501 | A1 | 9/2017 |

* cited by examiner

CONTROL DEVICE, PROCESSING METHOD, AND STORAGE MEDIUM

This application is a National Stage Entry of PCT/JP2021/037221 filed on Oct. 7, 2021, the contents of all of which are incorporated herein by reference, in their entirety.

TECHNICAL FIELD

The present invention relates to a control device, a processing method, and a storage medium.

BACKGROUND ART

Many technologies for remotely controlling control targets are being considered. Patent Document 1 discloses technology associated with a remote control system for remotely operating a control target, via a communication network, using a display terminal positioned at another location, wherein a mobile body provided with image capturing means is controlled.

CITATION LIST

Patent Literature

[Patent Document 1] Japanese Unexamined Patent Application, First Publication No. 2020-5146

SUMMARY OF THE INVENTION

Problems to be Solved by the Invention

In control technology as mentioned above, it is required to further improve the operability when controlling multiple control targets provided with image capturing means.

Therefore, an objective of the present invention is to provide a control device, a processing method, and a storage medium that can solve the above-mentioned problem.

Means for Solving the Problems

According to a first aspect of the present invention, a control device is provided with state displaying means for displaying multiple items of information associated with a state of a control target, and image displaying means for displaying an image relating to the control target in the state based on selection of one item of information among the multiple items of information.

According to a second aspect of the present invention, a processing method involves displaying multiple items of information associated with a state of a control target, and displaying an image relating to the control target in the state based on selection of one item of information among the multiple items of information.

According to a third aspect of the present invention, a storage medium makes a computer in a control device function as state displaying means for displaying multiple items of information associated with a state of a control target, and image displaying means for displaying an image relating to the control target in the state based on selection of one item of information among the multiple items of information.

Advantageous Effects of Invention

According to the present invention, the operability can be improved when controlling multiple control targets.

EXAMPLE EMBODIMENT

Hereinafter, a control device according to an embodiment of the disclosure will be explained with reference to the drawings.

Figure 1:
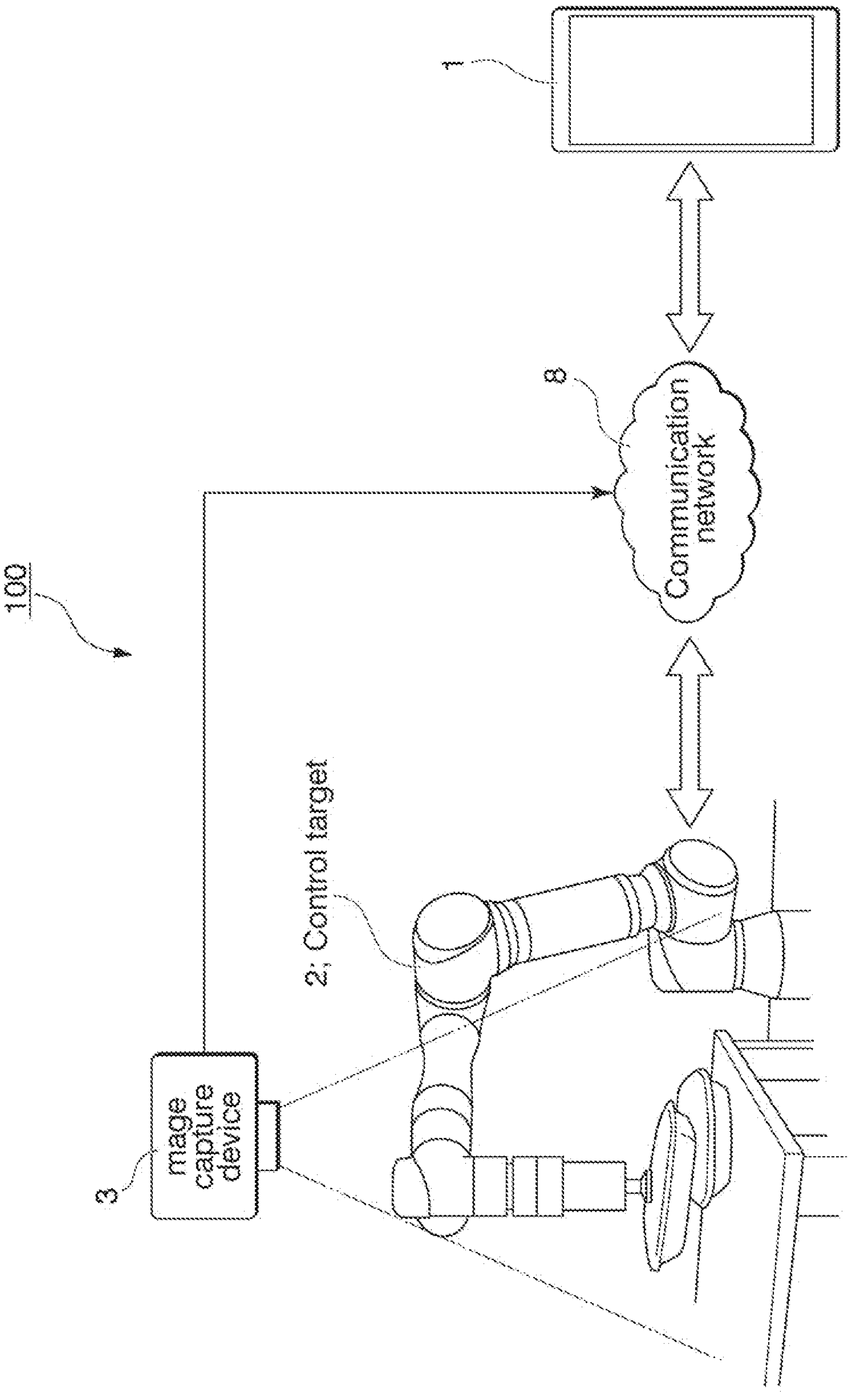
FIG. 1 A diagram illustrating the schematic configuration of a control system provided with a control device according to the present embodiment.

FIG. 1 is a diagram illustrating the schematic configuration of a control system 100 provided with a control device according to the present embodiment. The control system 100 has a control device 1, a control target 2, an image capture device 3, and a communication network 8. The control device 1 is communicably connected to the control target 2 and the image capture device 3 via the communication network 8.

In the example illustrated in FIG. 1, the control device 1 is communicably connected with one control target 2 and one image capture device 3. The control device 1 may be communicably connected with multiple control targets 2 and multiple image capture devices 3. A user operates the control device 1. The control device 1 controls the one or multiple control target(s) 2 and image capture device(s) 3 based on the operations by the user. The image capture device 3 is, for example, a camera that captures images of an area of space in which the actions or the state of the control target 2 appear. If the control target 2 is a robot arm, then the image capture device 3, for example, includes the arm of the control target 2 within the angle of view, and captures an area in an angle of view by which the movement state from a movement source to a movement destination of a target object gripped by the arm can be captured. One image capture device 3 may capture images so as to include the multiple control targets 2 and the space in which the control targets 2 are active. Alternatively, multiple image capture devices 3 may capture images so as to include a single control target 2 and the space in which that control target 2 is active. The image capture device 3 may be separate from or integrated into the control target 2. The images generated by the image capture device 3 capturing images may be moving images or they may be still images.

The control device 1 controls the control target 2 via the communication network. The control device 1 acquires images of the control target 2 captured by the image capture device 3. The control device 1 is, for example, a tablet terminal.

Figure 2:
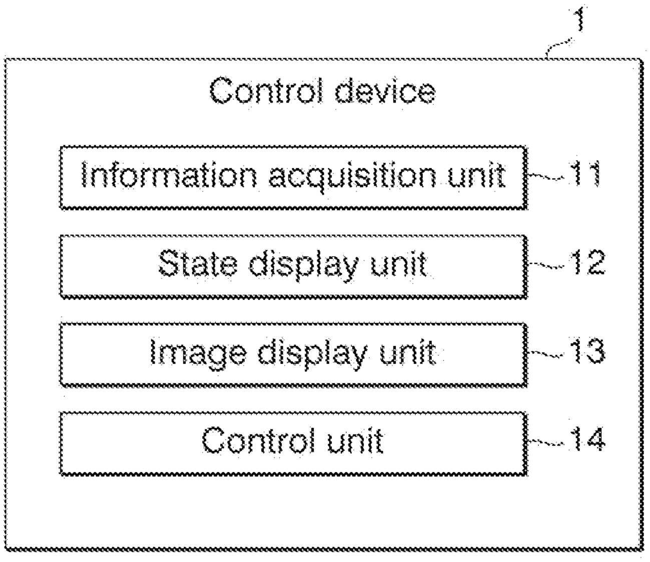
FIG. 2 A functional block diagram of a control device according to the present embodiment.

FIG. 2 is a functional block diagram of a control device according to the present embodiment.

The control device 1 has an information acquisition unit 11, a state display unit 12, an image display unit 13, and a control unit 14. A control program is executed. As a result thereof, the control device 1 performs the respective functions of the information acquisition unit 11, the state display unit 12, the image display unit 13, and the control unit 14.

The state display unit 12 displays information associated with the states of at least some of the control targets 2 among multiple control targets 2. The state display unit 12 may display information corresponding to the states of at least some of the control targets 2 among the multiple control targets 2. Hereinafter, for convenience of explanation, processing, etc. will be explained by using language such as "corresponding to", but said language may be replaced by language such as "associated with", "linked with", etc.

In the explanation below, it will be assumed that there are multiple states for the control targets 2. The multiple states are, for example, as mentioned below with reference to FIG. 5, etc., an abnormal state, a check state, an execution state, a manual recognition state, a manual control state, an on-site adjustment state, a work request state, etc. The multiple states may include states different from those mentioned above, and may be just some of the states mentioned above.

The information acquisition unit 11 acquires, from a computer (for example, the control device 1 or a recognition device operated by a user: hereinafter referred to as an external device) communicably connected to the control target 2, the image capture device 3, etc., images (or moving images) captured by the image capture device 3.

The image display unit 13, in response to the selection of information corresponding to one state among information corresponding to the multiple states, displays on a display (to be explained below with reference to FIG. 5), for example, information such as an image regarding the control target 2 in a state represented by a selected icon. The display is, for example, a display device of a touch panel display, a mobile terminal, an operating terminal for operating the control target, a notebook computer, or the like.

The image display unit 13 may receive, from an external device, instructions for the control target 2 or instructions for the control device, by operations performed on the display. Alternatively, the image display unit 13 may receive, from an external device, instructions for the control target 2 or instructions for the control device 1, by operations performed on an input device such as a mouse or an operating lever.

The control unit 14, for example, controls the control target 2 in accordance with instructions input via the image display unit 13. The control unit 14 may remotely control the control target 2, such as by controlling the control target 2 via the communication network 8.

In the present embodiment, the image display unit 13 receives a first operation C for selecting an icon representing one state among the information corresponding to the multiple states. The image display unit 13 performs display control for displaying a list of information, such as images of the control target 2 in the relevant state, based on the received first operation C. The image display unit 13 may display the list in overlay in an area in which an image of the control target 2 is being displayed. Alternatively, the image display unit 13 may display the list in an area different from the area in which an image of the control target 2 is being displayed.

The state display unit 12 displays icons representing at least some of the states among the multiple states. The state display unit 12 may divide control targets 2 that are in one state into multiple groups, and may display icons representing the respective groups. The state display unit 12 may display not only icons representing a single state, but also icons (hereinafter referred to as "comprehensive icons") representing information collectively representing at least some of the states among the multiple states. The comprehensive icons are, for example, single icon representing both the check state and the manual recognition state.

In the explanation below, the state display unit 12 will be assumed to display icons representing each state among the multiple states.

The state display unit 12 displays in overlay, on icons representing the respective states, the numbers of control targets 2 or information representing the numbers of control targets 2 (such as a number of dots equal to the relevant number or a number of rectangles equal to the relevant number) that are in those states. The state display unit 12 may display the numbers of control targets 2 that are in the respective states so as to be associated with icons (such as by being located above the icons, below the icons, or beside the icons) representing the relevant states.

Figure 5:
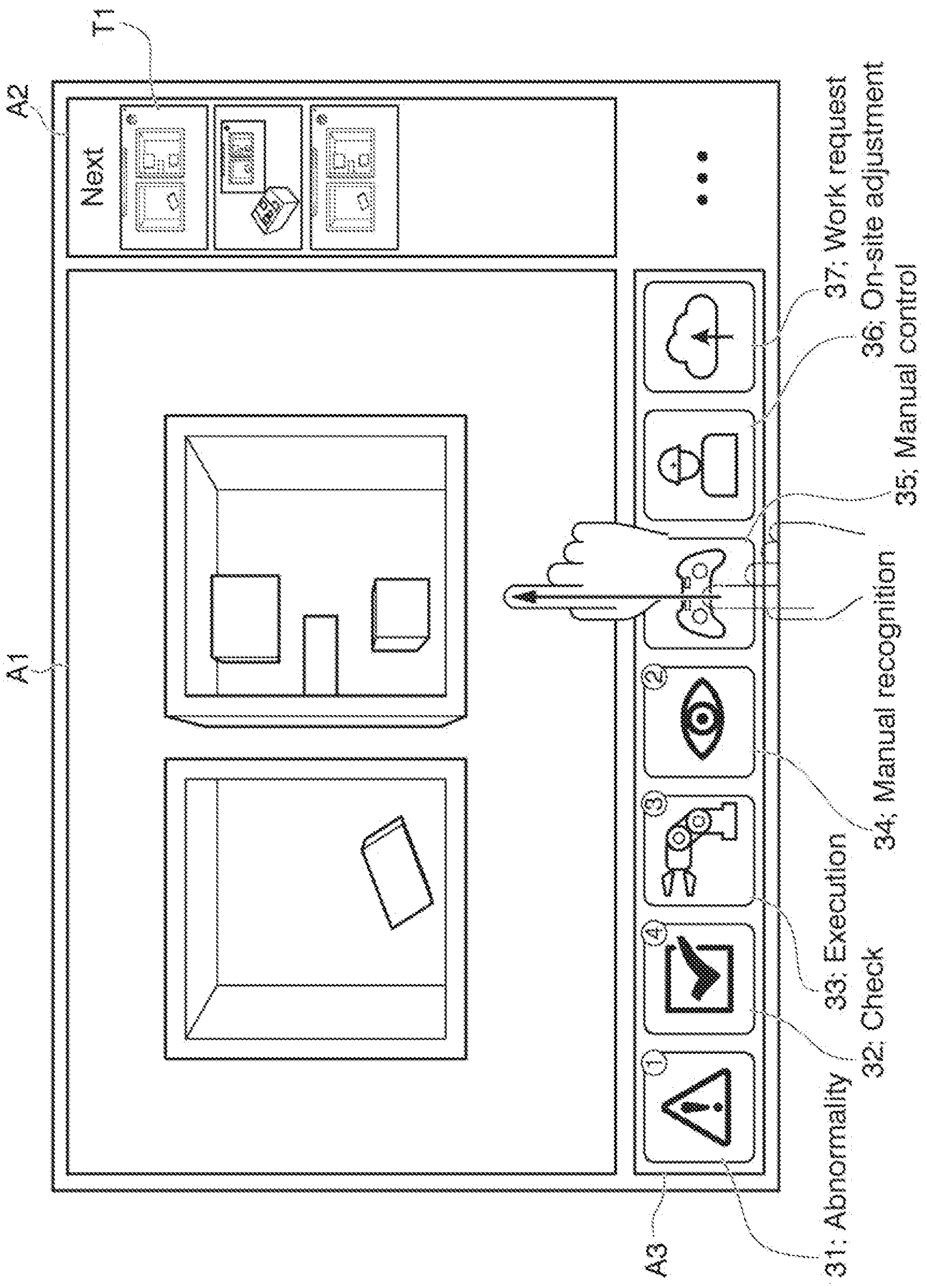
FIG. 5 A diagram illustrating an example of display information.

The control unit 14 acquires a second operation T for selecting at least one image in the list, and a third operation A for selecting at least one of the multiple icons. Images and display information including the icons (illustrated in FIG. 5) are displayed on the display. The images displayed in the second display area A2 in the display information illustrated in FIG. 5 are information representing control targets 2 that are in the state represented by the icon selected by the first operation C. For example, the control unit 14 implements control to make a control target 2 represented by an image selected by the second operation T transition to the state represented by the icon selected by the third operation A. In other words, due to the first operation C, the second operation T, and the third operation A, a control target 2 selected by the second operation Tis controlled to be changed from the state represented by the icon selected by the first operation C to the state represented by the icon selected by the third operation A.

Figure 3:
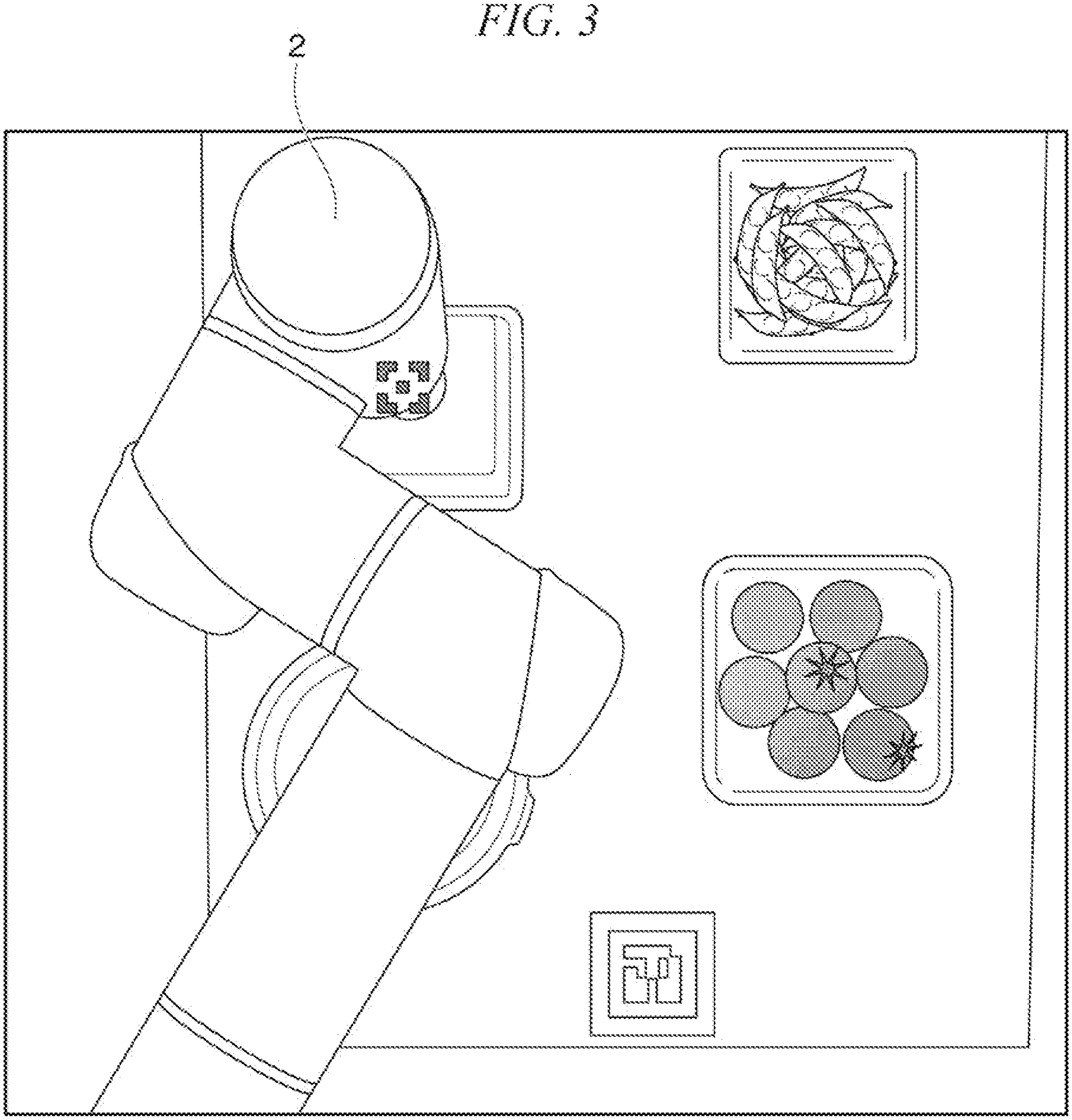
FIG. 3 A diagram conceptually illustrating an example of an image (or a moving image) displayed in a first display area.

FIG. 3 is a diagram conceptually illustrating an example of an image (or a moving image) displayed in a first display area A1.

In the first display area A1, an image (or a moving image) of a control target 2 being captured (or that has been captured) by the image capture device 3 is displayed. The moving image illustrated in FIG. 3 is an image showing the control target 2 performing actions for gripping an object placed at a certain position and moving said object to another position.

Figure 4:
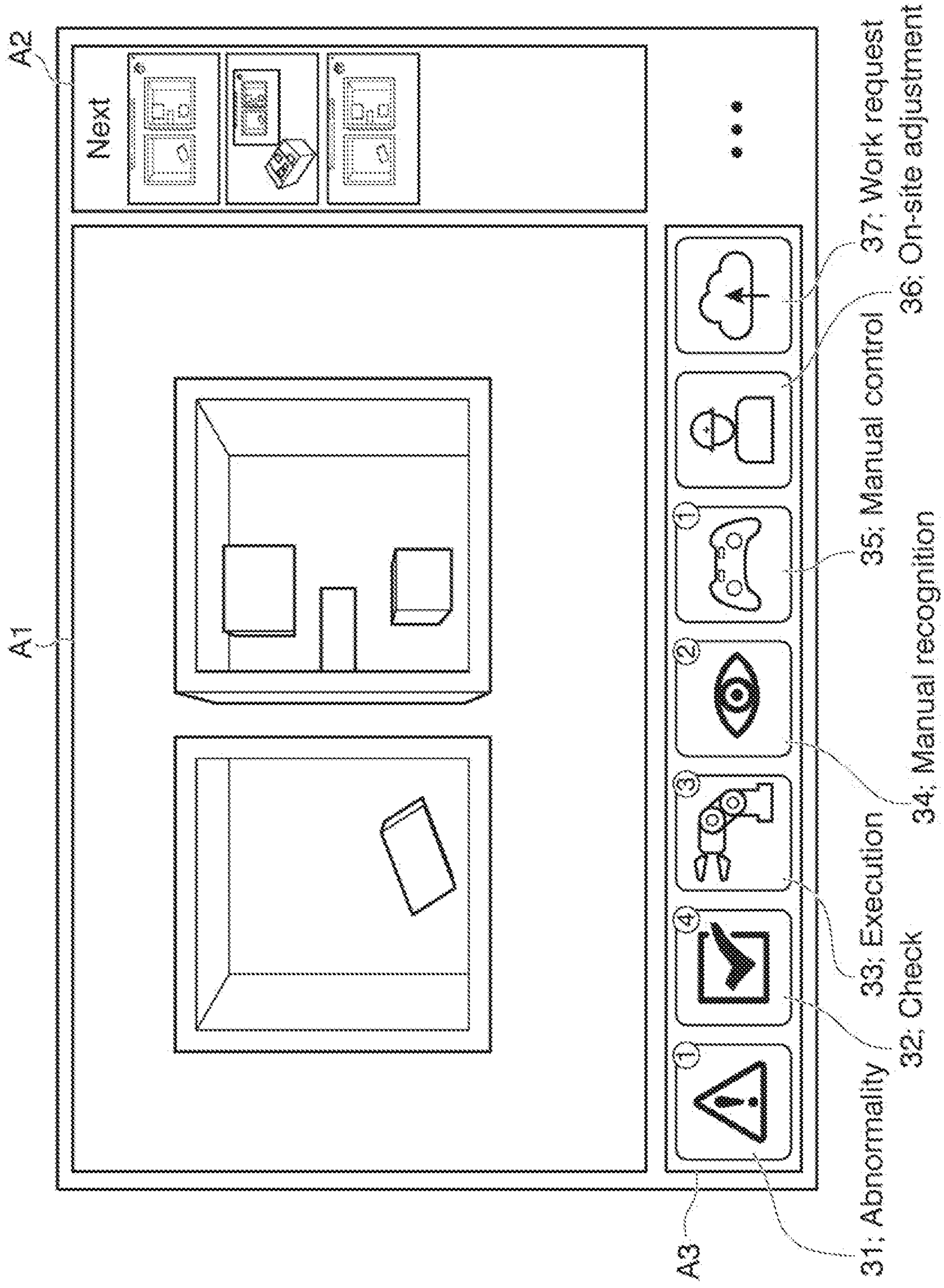
FIG. 4 A diagram conceptually illustrating an example of display information.

FIG. 4 is an image conceptually illustrating an example of display information.

The display information includes a first display area A1, a second display area A2, and a third display area A3.

The first display area A1 displays an image of a control target 2 captured by the image capture device 3.

The second display area A2 displays a list of thumbnails of control targets 2. The list includes, for example, in response to a first operation C, thumbnails of the respective control targets 2 that are in the state represented by the icon selected by the first operation C. There do not required to be multiple thumbnails included in the list, and the thumbnails may be for a single control target 2.

The third display area A3 displays icons representing respective states of the control targets 2.

The first display area A1, the second display area A2, and the third display area A3 are not limited to the embodiments illustrated in FIG. 4. In the display information, for example, the first display area A1, the second display area A2, and the third display area A3 may be in a vertically arranged form or may be in a horizontally arranged form.

The display information may be in a form in which the second display area A2 and the third display area A3 are located at adjacent positions. Due to such a form, the effects of reducing the operation amount required to move between the first operation C and the second operation T and the operation amount required to move between the second operation T and the third operation A are achieved.

The display information may be in a form in which the second display area A2, the third display area A3, and the first display area A1 are arranged in that order. Due to such an embodiment, the order of operations from the first operation C to the third operation A corresponds to one roundtrip of the display information. Thus, when the set of operations from the first operation C to the third operation A is to be repeated several times, the effect of reducing the operation amount required to move between the respective operations can be achieved.

Alternatively, the display information may be in a form including a third display area A3 corresponding to the first operation C (referred to as the "third display area A3C" for convenience) and a third display area A3 corresponding to the third operation A (referred to as the "third display area A3A" for convenience), with the third display area A3C, the second display area A2, and the third display area A3A arranged in that order ("display order"). Due to such an embodiment, the order of operations from the first operation C to the third operation A corresponds to the above-mentioned display order, thus providing the effect of facilitating operation.

Next, an example of the states of the control target 2 will be explained.

For convenience of explanation, the state of the control target 2 will be assumed to be one of an abnormal state, a check state, an execution state, a manual recognition state, a manual control state, an on-site adjustment state, and a work request state.

The abnormal state is a state in which there is an abnormality in the control target 2. Alternatively, the abnormal state is a state for the case in which it is recognized that an abnormality has occurred in the control target 2.

The check state is the state in which the state or the actions of the control target 2 is required to be checked by an external device that is communicably connected. The check state indicates, for example, the state of waiting for a check the control target 2 by a user operating the control device 1. The check state indicates a state in which the user is checking whether or not the actions of the control target 2 have been completed normally.

The execution state is a state in which the control target 2 is performing a prescribed series of actions.

The manual recognition state is a state in which the control target 2 is waiting for acquisition of information required for the actions of the control target 2 from an external device. Said state is, for example, a state of providing, from an external device, a target on which an action is to be performed by the control target 2, such as a target to be gripped by the control target 2 or a target to be conveyed by the control target 2, or the position of the target, the shape of the target, the size of the target, etc. The manual recognition state indicates, for example, the state of waiting for the input of information required for an action of gripping of the control target 2 by a user's operation on the control device 1.

The manual control state is a state of waiting for an operation by the control device 1 regarding the actions of the control target 2. The manual control state indicates, for example, a state in which the control target 2 is in a mode in which, due to an operation to input, to the control device 1, a movement amount for a prescribed portion of a robot arm, etc. on the control target 2, the prescribed portion of the control target 2 is actuated by the input movement amount. The manual control state is, for example, a state in which the control target 2 is actuated in accordance with a series of relevant operations by a user on the control device 1 to carry a target object from a certain position to another position.

The on-site adjustment state is a state of waiting for physical adjustment of the control target 2 at the location in which the control target 2 is performing actions. The on-site adjustment state is, for example, a state in which measures are being taken to return the control target 2 from an abnormal state having a physical cause (such as a mechanical malfunction or having dropped a gripped target) to a normal state. The on-site adjustment state can also be considered to indicate a state in which work such as repair, various adjustments, etc. are being performed at the site where the control target 2 is located, or a state of waiting for such work.

The work request state indicates a state in which the user is requesting another user who is operating another control device, for operation work regarding control of the control target 2. The icon for the work request state is used, for example, in cases such as when the user, in a state of using the control device 1 to perform operations regarding multiple control targets 2, wishes to lighten the work load of that user by transferring responsibility for some of the control targets 2 to another user.

The states of the control target 2 are not necessarily required to include all of the above-mentioned states, and states different from the above-mentioned examples may be included.

Next, the icons representing the respective states of the control target 2 and the operations on the icons will be explained.

Hereinafter, for convenience of explanation, it will be assumed that a single icon is associated with each of the above-mentioned states.

In the case of the above-mentioned example, the icons representing the states of the control target 2 displayed in the third display area A3 are one of an abnormality icon 31, a check icon 32, an execution icon 33, a manual recognition icon 34, a manual control icon 35, an on-site adjustment icon 36, and a work request icon 37. The icons displayed in the third display area A3 may be icons indicating states different from the respective states mentioned above.

The abnormality icon 31 is an icon representing an abnormal state of the control targets 2. The abnormality icon 31 has the function of displaying, in the second display area A2, in response to the first operation C, a list of thumbnails representing the control targets 2 that are in an abnormal state.

The check icon 32 is an icon representing a check state of the control targets 2. The check icon 32 has the function of displaying, for example, in the second display area A2, in response to the first operation C, a list of thumbnails representing the control targets 2 that are in the check state.

The execution icon 33 is an icon representing an execution state of the control targets 2. The execution icon 33 has the function of displaying, for example, in the second display area A2, in response to the first operation C, a list of thumbnails representing the control targets 2 that are in the execution state. Furthermore, the execution icon 33 has the function of controlling the states of the control targets 2 to be in the execution state in response to the second operation T and the third operation A.

The manual recognition icon 34 is an icon representing a manual recognition state. The manual recognition icon 34 has the function of displaying, for example, in the second display area A2, in response to the first operation C, a list of thumbnails representing the control targets 2 that are in the manual recognition state.

The manual control icon 35 is an icon representing a manual control state. The manual control icon 35 has the function of displaying, for example, in the second display area A2, in response to the first operation C, a list of thumbnails representing the control targets 2 that are in the manual control state.

The on-site adjustment icon 36 is an icon representing an on-site adjustment state. The on-site adjustment icon 36 has the function of displaying, for example, in the second display area A2, in response to the first operation C, a list of thumbnails representing the control targets 2 that are in the on-site adjustment state.

The work request icon 37 is an icon representing a work request state. The work request icon 37 has the function of displaying, for example, in the second display area A2, in response to the first operation C, a list of thumbnails representing the control targets 2 that are in the work request state.

In the example illustrated in FIG. 4, the state display unit 12 displays in overlay, on the icons displayed in the third display area A3, information representing the number of the control targets 2 in those states.

Furthermore, the operations on the icons will be explained with reference to FIG. 5. FIG. 5 is a diagram illustrating an example of display information displayed on a display, etc.

The operations that can be implemented on the display information include a first operation C, a second operation T, and a third operation A.

The first operation C is, for example, an operation for selecting an icon in the third display area A3 and swiping in the direction of the first display area A1. As one example, suppose that the control device 1 is a tablet terminal. When performing the first operation C on an icon, the user touches the icon with a finger and moves the finger from the third display area A3 to the first display area A1 while still touching the icon.

For example, in the first operation C, the manual control icon 35 displayed in the third display area A3 is swiped in the direction of the first display area A1. In this case, the second display area A2 displays a list of thumbnails that are single frame in moving images including the space in which the control targets 2 that are in the state represented by the manual control icon 35 are performing actions.

Furthermore, in response to one of the thumbnails in the list being selected by the second operation T, the image display unit 13 displays, in the first display area A1, a moving image including the space in which the control target 2 represented by the selected thumbnail is performing actions. Alternatively, in the case in which a moving image including the space in which the control target 2 is performing actions is displayed in the first display area A1, the image display unit 13, in response to one of the thumbnails in the list being selected by the second operation T, displays the moving image displayed in the first display area A1 by switching to a moving image including the space in which the control target 2 represented by the selected thumbnail is performing actions.

Figure 6:
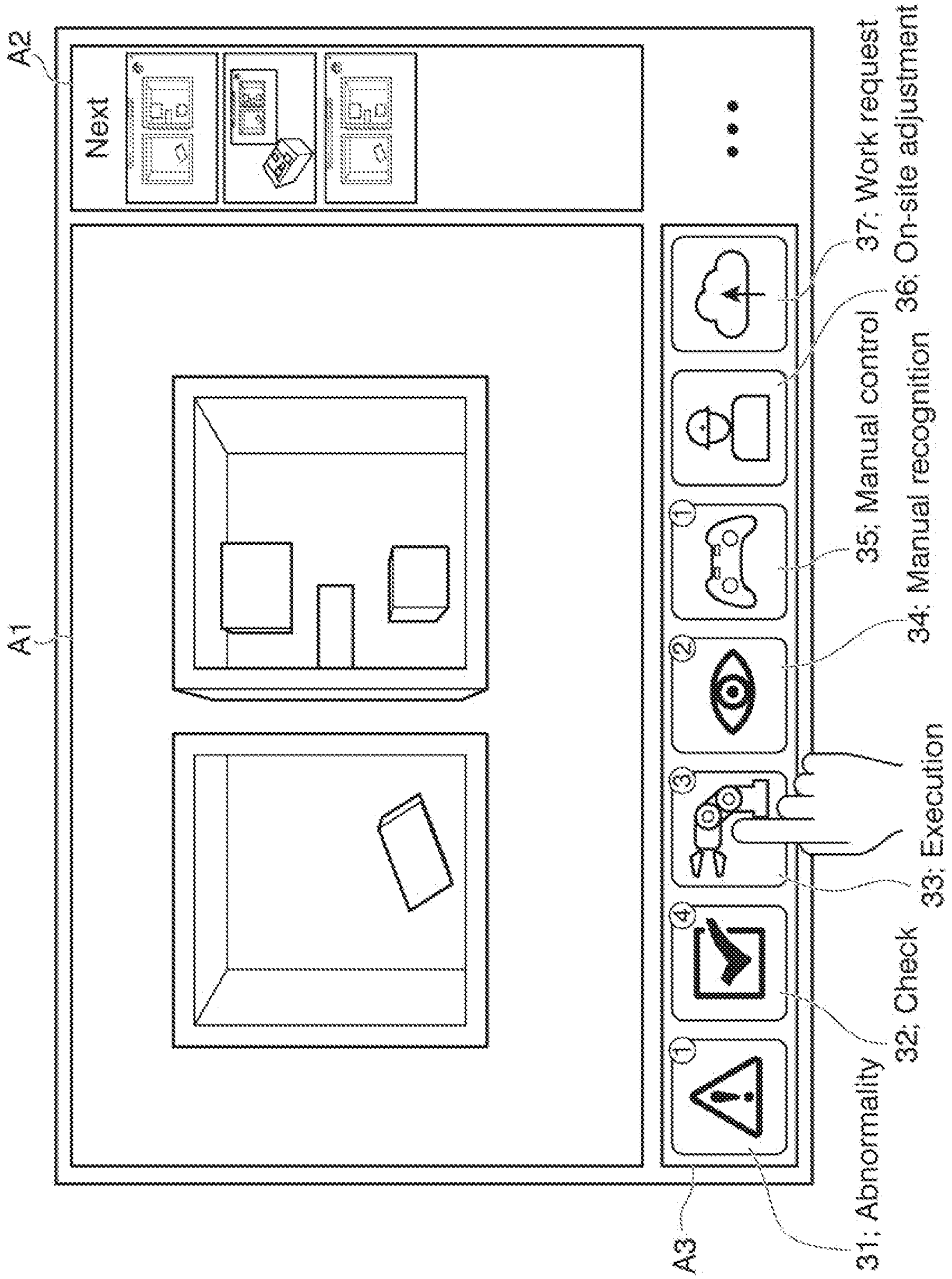
FIG. 6 A diagram illustrating an example of display information.

The third operation A will be explained with reference to FIG. 6. FIG. 6 is a diagram illustrating an example of display information displayed on a display, etc.

In the state in which the moving image including the space in which the control target 2 is performing actions is displayed in the first display area A1, the user performs the third operation A on a certain icon. Suppose that a user has touched the execution icon 33 by performing the third operation A.

The image display unit 13 identifies the icon on which the third operation A was performed. The control unit 14 controls the control target 2 displayed in the first display area A1 so that said control target 2 is put in the state represented by the identified icon. The control unit 14 transmits, to the control target 2 displayed in the first display area A1, a control signal for instructing said control target 2 to transition to the state represented by the execution icon 33.

Figure 7:
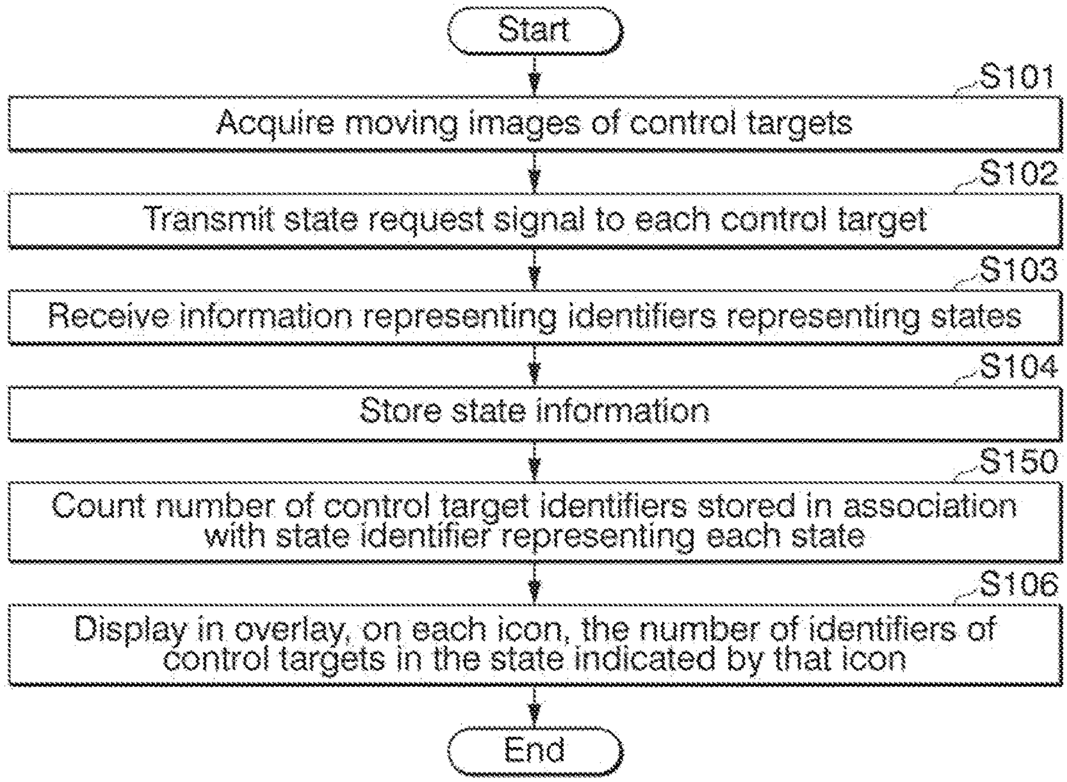
FIG. 7 A flow chart illustrating the flow of processing in the control device.

The processing in the control device 1 will be explained with reference to FIG. 7. FIG. 7 is a flow chart indicating the flow of processing in the control device 1.

Suppose that an image of a control target 2 is being captured by the image capture device 3. In other words, suppose that the image capture device 3 prepares a moving image including the space in which the control target 2 is performing actions. Suppose that, in the initial state, the first display area A1 and the second display area A2 are not displayed. Suppose that the abnormality icon 31 to the work request icon 37 as described above are displayed in the third display area A3.

The control device 1 communicably connects with the image capture device 3 capturing the image of the control target 2 and acquires a moving image including the space in which that control target 2 is performing actions (step S101). The moving image acquired by the control device 1 may be that of a single control target 2, or may be of multiple control targets 2.

For convenience of explanation, it is assumed that a state request signal is transmitted to each control target 2.

The information acquisition unit 11 transmits a state request signal to each control target 2 (step S102). The control device 1 is not necessarily required to transmit state request signals to all of the control targets 2, and may transmit state request signals to just some of the control targets 2. If the states of the control targets 2 are recognized in the image capture device 3, the control device 1 may transmit a state request signal to the image capture device 3. The control targets 2 receive the state request signals and identify their own states. Each control target 2 transmits, to the control device 1, information representing an identifier (hereinafter referred to as "state identifiers") representing the identified states.

The information acquisition unit 11 receives the information (step S103) and prepares state information in which the states identified by that information are associated with identifiers (hereinafter referred to as a "control target identifier") representing the control target 2 to which the state request signal is transmitted. Therefore, the state information can be considered to be information in which a control target identifier representing a control target 2 is associated with a state identifier representing the state of the control target 2. The information acquisition unit 11 may store the prepared state information in a storage unit (not illustrated) (step S104).

The state display unit 12 calculates the number of control targets 2 in each state based on the state information. The state display unit 12, for example, reads out control state identifiers stored in association with the state identifier representing each state in the state information, and counts the number of control state identifiers (step S105). The state display unit 12 displays in overlay, on each icon displayed in the third display area A3, the number of identifiers of control targets 2 in the state indicated by that icon (step S106). That is, the state display unit 12 displays, in association with each icon, the number of control targets 2 in the state indicated by the icon.

Figure 8:
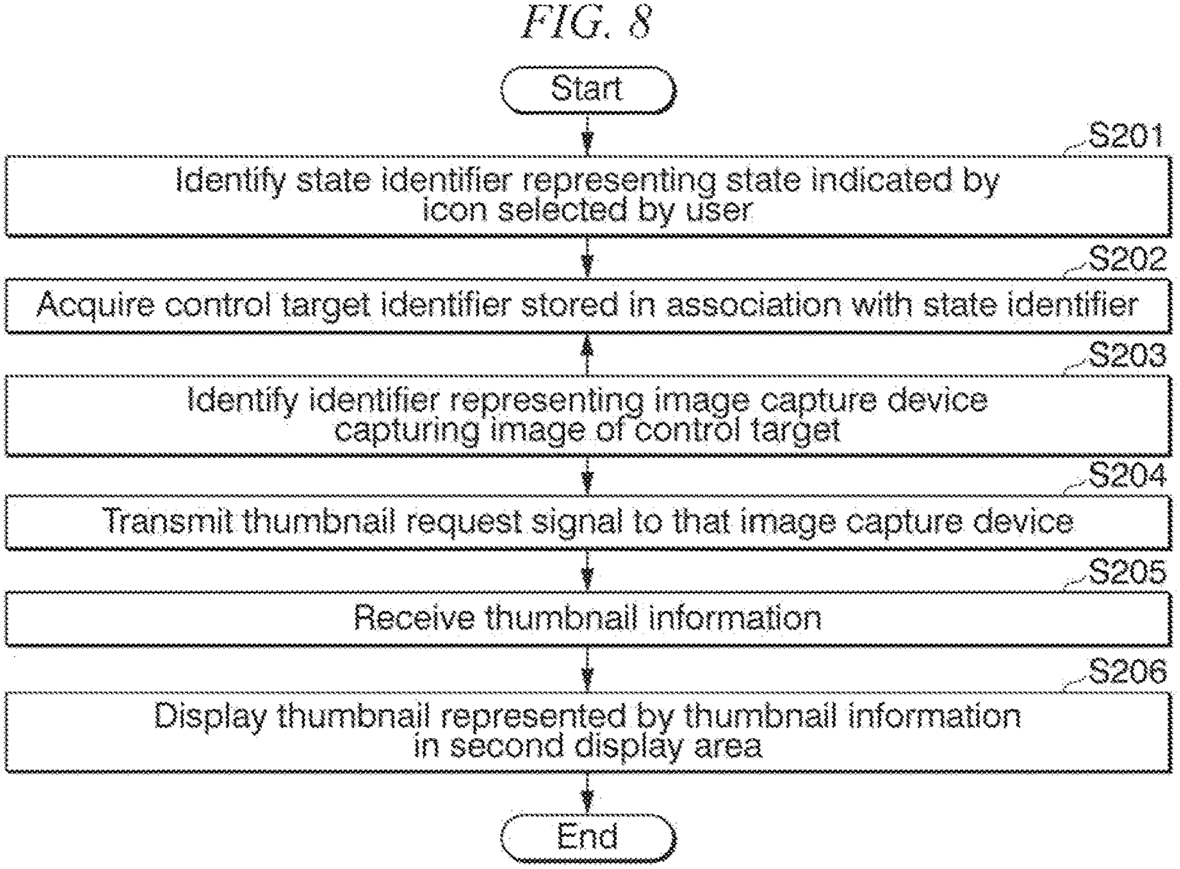
FIG. 8 A flow chart illustrating the processing flow relating to a first operation C of the processing in the control device.

Next, the processing for the first operation C will be explained with reference to FIG. 8. FIG. 8 is a flow chart indicating the processing flow for the first operation C among the processes in the control device 1. The first operation C is an example of a process for displaying, in the second display area A2, a list of thumbnails relating to the control targets 2 in a certain state.

A user, in the first operation C, selects one icon among the icons displayed in the third display area A3. The information acquisition unit 11 identifies the icon selected by the user and identifies a state identifier representing the state indicated by that icon (step S201). The information acquisition unit 11 outputs information representing the identified state identifier to the image display unit 13.

The image display unit 13 acquires the information representing the state identifier. The image display unit 13 acquires a control target identifier stored in association with said state identifier in the state information (step S202). If there are multiple control target identifiers, the image display unit 13 acquires those control target identifiers. When there are no control target identifiers stored in correspondence with the state identifier in the state information, the image display unit 13 does not acquire a control target identifier.

The image display unit 13 identifies an identifier (hereinafter referred to as an "image capture device identifier") representing an image capture device 3 capturing images of the control target 2 (step S203). The image display unit 13, for example, references system information in which the control target identifiers representing the control targets 2 are associated with image capture device identifiers identifying the image capture devices 3 capturing the control targets 2, thereby identifying the image capture device identifier associated with the control target identifier in the system information. The image display unit 13, based on the acquired image capture device identifier, transmits a thumbnail request signal requesting the image capture device 3 represented by the image capture device identifier to send, to the control device 1, information (hereinafter referred to as "thumbnail information") representing a thumbnail of the control target 2 captured by the image capture device 3 (step S204).

The image capture device 3 receives the thumbnail request signal. The image capture device 3, in response to the thumbnail request signal, for example, prepares a thumbnail that is a single frame in a moving image generated by capturing the control target 2, and transmits thumbnail information representing the prepared thumbnail to the control device 1.

The image display unit 13 receives the thumbnail information (step S205). The image display unit 13 displays a thumbnail representing the thumbnail information in the second display area A2 (step S206). When there are multiple control targets 2 in the state indicated by the icon selected by the first operation C, the image display unit 13 receives thumbnail information from the image capture devices 3 capturing the respective control targets 2. The image display unit 13 displays the thumbnail included in each received item of thumbnail information in the second display area A2. That is, the image display unit 13 displays a list of thumbnails in the second display area A2. As a result thereof, a list of thumbnails for all of the control targets 2 that are in the state indicated by the icon on which the first operation C was performed, is displayed in the second display area A2. Therefore, according to the process described above, thumbnail information can be acquired for each control target 2 that is in the state indicated by the icon. The image display unit 13 may prepare thumbnail management information in which identifiers representing thumbnail information and image capture device identifiers of the image capture devices 3 that transmitted the thumbnail information are stored in association with each other, and may store the prepared thumbnail management information in a storage unit.

Suppose that, in step S201 above, the manual control icon 35 displayed in the third display area A3 has been swiped in the direction of the first display area A1 by a first operation C. In this case, the image display unit 13 displays, in the second display area A2, a list of thumbnails that are single frames in moving images including the spaces in which control targets 2 that are in the state represented by the manual control icon 35 are performing actions. Additionally, in this case, the image display unit 13 may further display, in a portion of a display area such as the third display area A3, an image of an operator for a user to control and operate manually, by a prescribed amount at a time, the movement amount of a moving portion, such as a robot arm, of a control target 2, in overlay on the third display area A3. If the control target 2 has a robot arm, the operator may be an operator or the like for providing instructions on the movement direction of the robot arm.

Figure 9:
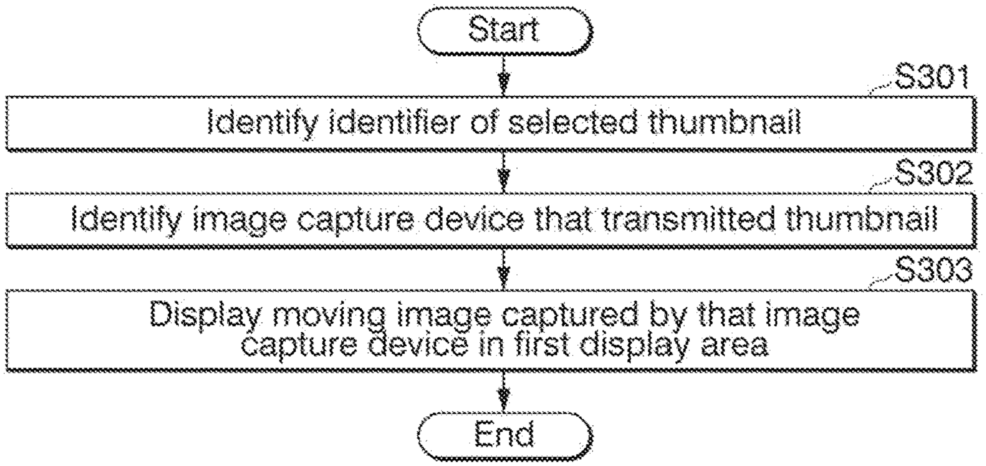
FIG. 9 A flow chart illustrating the processing flow relating to a second operation T of the processing in the control device.

Next, the processing for the second operation T will be explained with reference to FIG. 9. FIG. 9 is a flow chart indicating the processing flow for the second operation T among the processes in the control device 1.

The image display unit 13, during the processing for the second operation T, has established, in advance, communication sessions with image capture devices 3 capturing images of the control targets 2 for the control targets 2 represented by at least some of the thumbnails in the list of thumbnails. When a communication session with an image capture device 3 has been established, the image display unit 13 may buffer the images captured by the image capture device 3 in the control device 1. Therefore, the image display unit 13 waits to be able to provide moving images corresponding to thumbnails displayed in the second display area A2 in response to the second operation T.

The image display unit 13 may establish a communication session in response to the process for displaying the list of thumbnails in the second display area A2. The image display unit 13 may hold a communication session that was established in response to the process for transmitting a state request signal to a control target (step S102 in FIG. 7). That is, the timing at which the communication session is established is not limited to the example mentioned above.

The image display unit 13 may establish a communication session in response to detecting that the second operation T has been performed.

The user, in the second operation T, for example, selects a thumbnail in the list of thumbnails displayed in the second display area A2 by touching the desired thumbnail.

The information acquisition unit 11 identifies the selected thumbnail and identifies an identifier (hereinafter referred to as a "thumbnail identifier T1") representing the identified thumbnail (step S301). The information acquisition unit 11 outputs information representing the thumbnail identifier T1 to the image display unit 13. The image display unit 13, based on the thumbnail identifier T1, identifies the image capture device 3 that transmitted the thumbnail represented by the thumbnail identifier T1 (step S302). For example, the control device 1 identifies the image capture device 3 that transmitted the thumbnail identifier T1 by reading the image capture device identifier stored in the above-mentioned thumbnail management information in association with the thumbnail identifier T1.

The image display unit 13 acquires an image (or a moving image) captured by the identified image capture device 3, for example, via a communication session that was established in advance, and displays the acquired image in the first display area A1 (step S303).

In other words, the image display unit 13 transmits a moving image acquisition request to the image capture device 3 via the communication session. An image capture device 3 that has received a distribution request transmits a moving image that is being captured to the control device 1 by using technology such as streaming distribution. The 5 image display unit 13 in the control device 1 acquires the moving image via the communication session and displays the acquired image in the first display area A1. As a result thereof, according to the control device 1, a moving image corresponding to the thumbnail represented by the thumbnail identifier T1 can be displayed.

Figure 10:
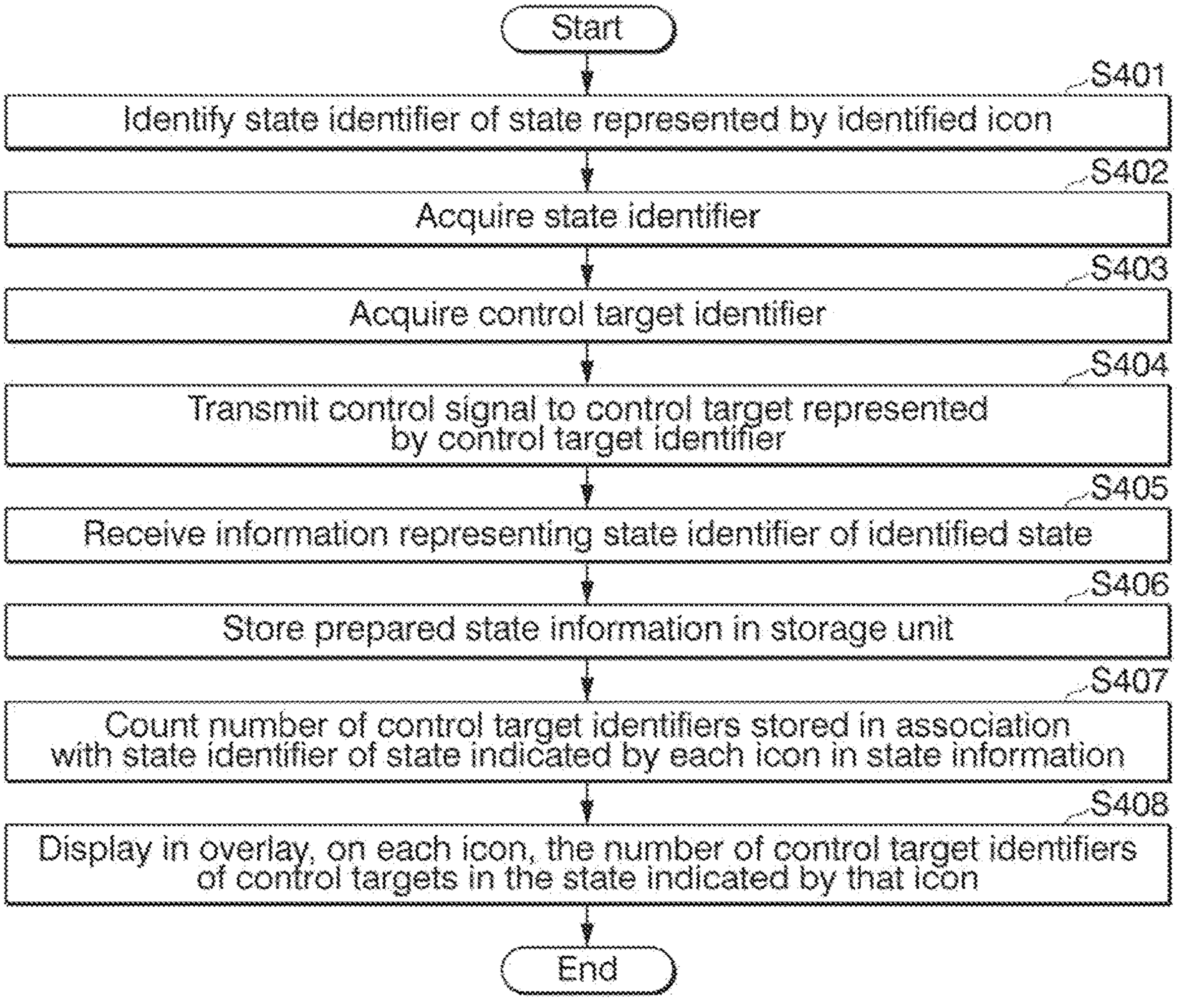
FIG. 10 A flow chart illustrating the processing flow relating to a third operation A of the processing in the control device.

The processing performed in response to the third operation A will be explained with reference to FIG. 10. FIG. 10 is a flow chart indicating the processing flow regarding the third operation A among the processes in the control device.

Suppose that a moving image for a certain control target 2 is being displayed in the first display area A1. Suppose that a user selects one of the icons displayed in the third display area A3 in the third operation A.

The information acquisition unit 11 identifies the selected icon and identifies a state identifier of the state represented by the identified icon (step S401). The information acquisition unit 11 outputs the state identifier to the control unit 14.

The control unit 14 acquires the state identifier (step S402). The control unit 14 acquires the control target identifier representing the control target 2 in the image being displayed in the first display area A1 (step S403). The control unit 14 may acquire a control target identifier stored in association with the image capture device identifier representing the image capture device capturing said image based on system information. The control unit 14 transmits, to the control target 2 represented by the control target identifier, a control signal for controlling the state of the control target 2 to transition to the state represented by the acquired state identifier (step S404).

The control target 2 receives the control signal. The control target 2 acquires the state identifier included in the control signal and performs actions to enter the state represented by the state identifier. For example, if the state identifier included in the control signal indicates "execution", the control target 2 performs actions in accordance with a prescribed program indicating the actions. If the state identifier included in the control signal indicates "check", the control target 2 stops the actions being executed based on the program.

The control target 2 may, for example, identify the state to which to transition after performing the actions by receiving the control signal mentioned above. The control target 2 may analyze its own state to identify the state after the actions have been performed. Alternatively, the image capture device 3 capturing images of the control target 2 may analyze the state of the control target 2 to identify the state after the actions have been performed. The control target 2 prepares information representing the state identifier of the identified state and transmits the prepared information to the control device 1.

The control device 1 receives said information (step S405). The control device 1 prepares state information in which the control target identifier of said control target 2 is stored in association with the state identifier of the state included in said information, and stores the prepared state information in a storage unit in the control device 1 (step S406).

The state display unit 12 counts the number of control target identifiers stored in association with the state identifier of the state indicated by each icon in the state information (step S407). The state display unit 12 displays in overlay, on each icon displayed in the third display area A3, the number of control target identifiers of the control targets 2 in the state indicated by that icon (step S408). That is, the state display unit 12 displays, in association with each icon, the number of control targets in the state represented by that icon. Due to this feature, when the number of control targets 2 in a certain state changes due to a user performing the third operation A on the icon indicating that state, the latest number of control targets 2 after the change is displayed in overlay on the icon indicating that state. As a result thereof, the user can understand the latest number of control targets 2 in each state.

Suppose that a user has selected one icon among the icons displayed in the third display area A3, and thereafter, has selected another icon displayed in the third display area A3. In this case, the control device 1 repeats the process from the above-mentioned step S401 based on the selection of the other icon. The control unit 14 detects the selection of the other icon based on the state identifier acquired in step S402. Then, the control unit 14 acquires that state identifier and acquires, from the system information, the image capture device identifier representing the image capture device capturing the image displayed in the first display area A1. The control unit 14 outputs the image capture device identifier to the image display unit 13. The image display unit 13, based on the image capture device identifier, identifies the image capture device 3 capturing images so as to include the action space of the control target 2 that transmitted the control signal. The image display unit 13 determines whether or not an image (or a moving image) captured by the identified image capture device 3 is being displayed in the first display area A1. The image display unit 13 starts a display process in the case in which an image (or moving image) captured by the identified image capture device 3 is not being displayed in the first display area A1. In this display process, in a manner similar to the process described above, the image display unit 13 acquires an image (or a moving image) captured by the identified image capture device 3, for example, via a communication session that has been established in advance, and displays the acquired image in the first display area A1.

The process explained by using FIG. 10 is an example of a process for implementing control so that the control target 2 relating to the image that has been selected and operated enters the state represented by the icon on which the third operation A was performed, based on the second operation T performed on one image and the third operation A performed on information corresponding to one state.

According to the control device 1 described above, a user interface for efficiently operating multiple control targets 2 can be provided. Additionally, according to the processing in the control device 1 described above, it is possible to use a single icon to transition to a state selected by a user, by means of a third operation A performed on a list of images relating to control targets 2 in a state selected by the user by means of a first operation C and the control target 2 corresponding to a moving image that is being displayed. Due to this feature, there are only a few display items, such as icons, to be displayed on the user interface, and high visibility can be secured in the user interface for controlling the control targets 2. Additionally, since the control targets 2 can be controlled by just the first operation C and the third operation A, they can be intuitively operated by the user, the operations can be easily memorized, and the user can be provided with a sense of reassurance regarding operation. Additionally, due to the process in the control device 1 described above, the states of checking the respective images of the control targets 2 in a prescribed state can be displayed by only performing the first operation C. Additionally, the control target 2 relating to a moving image displayed in the first display area A1 can be controlled so that the control target 2 is put in a desired state by means of the third operation A. Therefore, the control target 2 can be put in the desired state by the user performing only a single operation. As a result thereof, the work efficiency of the user can be raised and operation errors can be reduced.

The information acquisition unit 11 in the control device 1 may change the sizes of the moving image displayed in the first display area A1 or the thumbnails displayed in the second display area A2 based on operations from another device that is communicably connected. As a result thereof, even during remote operation, the action state of a control target 2 can be recognized with good visibility based on a moving image from an image capture device 3 corresponding to the control target 2, thus allowing human error due to the user to be reduced.

The state display unit 12 in the control device 1 in the process described above may be provided with a function, when controlling a control target 2 in a certain state, for restricting the operation of icons representing states different from prescribed state transitions, so that those different states cannot be selected. For example, suppose that, due to a user performing a first operation C on the abnormality icon 31, a list of thumbnails of moving images corresponding to control targets 2 in a state represented by the abnormality icon 31 is displayed in the second display area A2. Additionally, suppose that transitions from the abnormal state to the execution state are not permitted. In this case, the control device 1 may implement control so as not to detect operations on the execution icon 33 representing the execution state. Alternatively, the control device 1 may, for example, provide a notification that a transition to the execution state is not permitted by a process of graying out the execution icon 33. As a result thereof, errors by the user can be prevented.

Additionally, the information acquisition unit 11 in the control device 1 may display selected thumbnails in the second display area A2 or selected icons so as to be framed or so as to be highlighted. Due to this feature, the user can intuitively recognize progress in an operation.

The control device 1 displays the first display area A1 and the second display area A2 adjacent to each other in the display information. Due to this feature, a user can easily perform the first operation C on an icon.

The image display unit 13 in the control device 1 displays, in a column in the second display area A2, a list of thumbnails for control targets 2 in the state indicated by the icon on which the first operation C was performed. The image display unit 13 displays, in the first display area A1, a moving image corresponding to a thumbnail selected in this list. However, if the moving image displayed in the first display area A1 becomes unable to be displayed due to some sort of problem, the image display unit 13 may select another thumbnail in the list, switch the moving image to one corresponding to the selected thumbnail, and display the moving image in the first display area A1. The image display unit 13 may rearrange the list so that the thumbnail corresponding to the moving image being displayed in the first display area A1 is at the top of the list, and may display that list. In the case in which the playing of a moving image is stopped due to some sort of problem in the moving image, the image display unit 13 may delete the thumbnail corresponding to that moving image from the list.

In the example described above, an example in which the control target 2 is controlled so that the target operated by the control device 1 grips a target object and moves from a certain position to another position, is indicated. However, the control target 2 operated by the control device 1 may be a robot such as an articulated robot, a moving body such as an aircraft, a drone, an automobile, or an unmanned transport vehicle (Automatic Guided Vehicle), an image capture device 3, or heavy machinery such as a crane.

Additionally, the states indicated by the icons displayed in the third display area A3 as display information may be icons displaying, in the third display area A3, a list of control targets in other states. For example, in the case in which the control target is a drone, they may be an icon representing the state of ascending flight, an icon representing the state of descending flight, an icon representing a hovering state, an icon representing a state of horizontal flight, an icon representing a landed state, etc. That is, the control device 1 may display information corresponding to the state of each of multiple control targets, and may, based on the selection of information corresponding to one state in the information corresponding to the multiple states, display images relating to control targets corresponding to those states.

In the example described above, an embodiment is indicated in which the multiple icons displayed in the third display area A3 are icons corresponding to certain states among multiple states associated with the control targets 2. However, in other embodiments, the multiple icons displayed in the third display area A3 may be icons corresponding to control of control targets. For example, the icons may be an icon corresponding to first control, an icon corresponding to second control, an icon corresponding to third control, etc.

In this case, the control device 1 may display information representing control of each of the multiple control targets 2 and, based on the selection of information representing one type of control in the information representing multiple types of control, display images relating to the control targets 2 corresponding to that type of control.

In this case, the control device 1 displays in the second display area A2, based on the first operation C on information representing the one type of control among the information representing multiple types of control, a list of thumbnails relating to control targets 2 corresponding to that type of control. The control device 1 displays respective icons corresponding to multiple diverse control details. The control device 1 displays in overlay, on each of the icons, the number of control targets 2 controlled in accordance with control details represented by that icon. The control device 1, based on a selection operation of one image among the images relating to multiple control targets 2 and a second operation T on information representing one type of control in the information representing multiple types of control, controls the control target 2 relating to the image that has been selected and operated so that the control target 2 performs actions in accordance with the control details represented by the second operation T.

The icons described above are one embodiment of information corresponding to the state of each of the control targets 2, and as information to be operated by a user in the control device 1, information other than icons may be displayed in the third display area A3.

In the explanation above, an example of the case in which a user can perform a first operation C and a third operation A on the icons is indicated. However, the control device 1 may further detect various operations performed by the user on the icons, such as a fourth operation and a fifth operation, and may perform corresponding control and operations. In this case, the control device 1, based on any operation among the many operations described above performed on one item of information among multiple items of information, performs display control for displaying a list of images relating to control targets that are in the state represented by that information in an area different from the display area of the captured image. Additionally, in this case, the control device 1, based on the selection of one image in the list of images and any operation among the many operations described above performed on one item of information among the multiple items of information, controls the control target so that the control target relating to the selected image is put in the state represented by the operated information.

Figure 11:
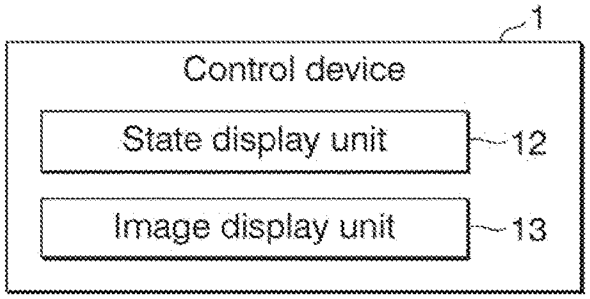
FIG. 11 A diagram illustrating the configuration of the control device according to the present embodiment.

FIG. 11 is a diagram illustrating the configuration of the control device according to the present embodiment.

Figure 12:
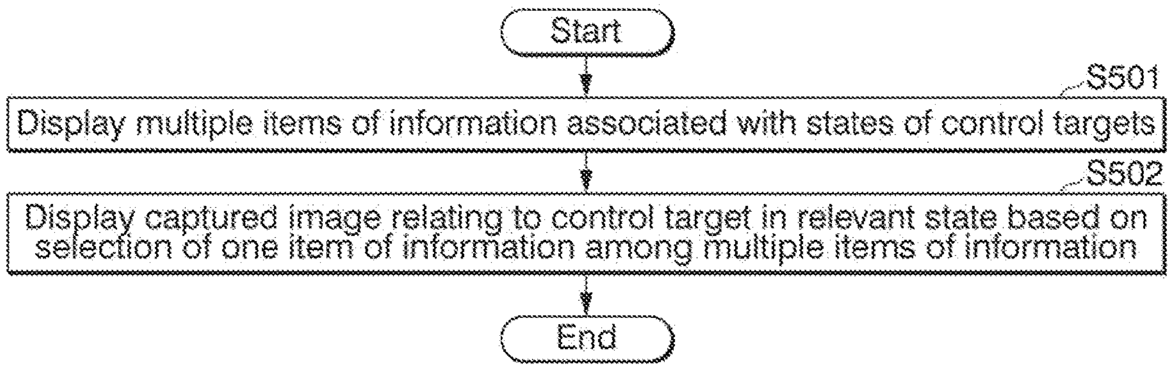
FIG. 12 A flow chart illustrating the processing flow by the control device according to the present embodiment.

FIG. 12 is a flow chart indicating the processing flow by the control device according to the present embodiment.

The control device 1 is provided with a state display unit 12 and an image display unit 13.

The state display unit 12 displays multiple items of information associated with the states of control targets 2 (step S501).

The image display unit 13, based on the selection of one item of information among the multiple items of information, displays an image regarding a control target 2, which is in the relevant state (step S502).

The state display unit 12 can be realized by using a function similar to the function of the state display unit 12 in FIG. 2. The image display unit 13 can be realized by using a function similar to the function of the image display unit 13 in FIG. 2. Therefore, the control device 1 can be realized by using a function similar to the function of the control device 1 in FIG. 2.

(Hardware Configuration Example)

Figure 13:
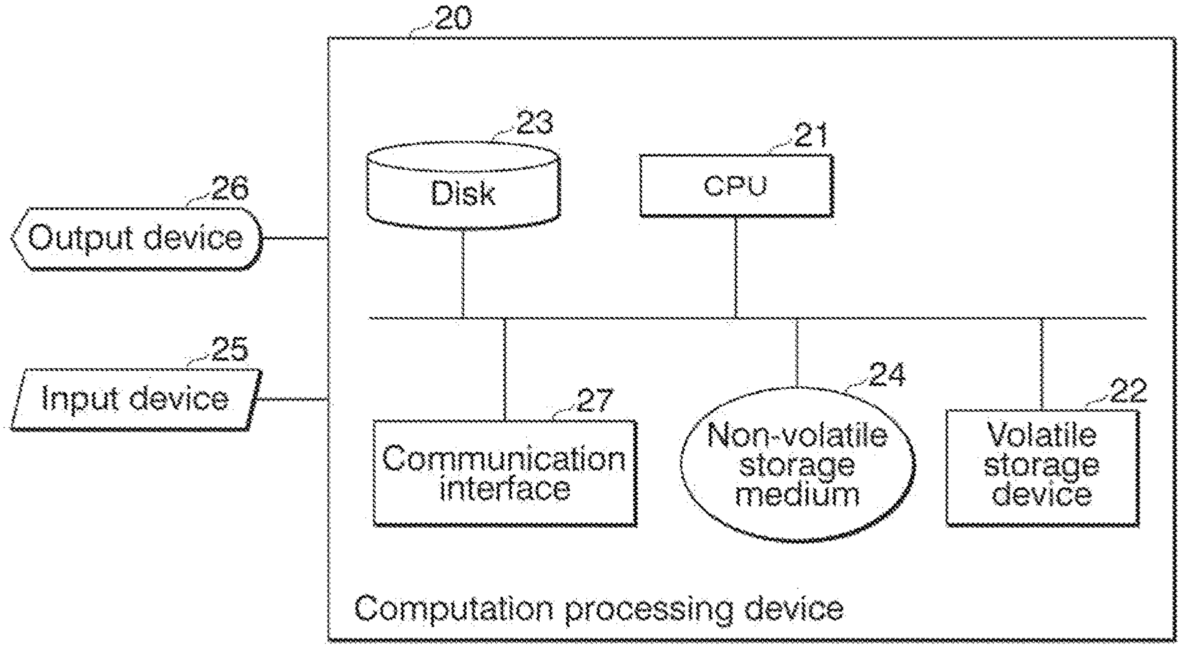
FIG. 13 A hardware configuration diagram of a control device according to the present embodiment.

FIG. 13 is a hardware configuration diagram of a control device.

A configuration example of hardware resources for using a single computation processing device (information processing device, computer) to realize the control device according to the respective embodiments of the disclosure described above will be explained. However, this control device may be realized by physically or functionally using at least two computation processing devices. Additionally, this control device may be realized as a dedicated device.

FIG. 13 is a block diagram schematically illustrating a hardware configuration example of a computation processing device capable of realizing a control device according to the respective embodiments of the disclosure. The computation processing device 20 has a central processing device (Central Processing Unit, hereinafter referred to as a "CPU") 21, a volatile storage device 22, a disk 23, a non-volatile recording medium 24, and a communication interface (hereinafter referred to as a "communication IF") 27. The computation processing device 20 may be capable of connecting to an input device 25 and an output device 26. The computation processing device 20 can exchange information with communication devices and other computation processing devices via the communication IF 27.

The non-volatile recording medium 24 is, for example, a compact disc or a digital versatile disc that is computer-readable. Additionally, the non-volatile recording medium 24 may be a universal serial bus memory (USB memory), a solid-state drive, etc. The non-volatile recording medium 24 holds a relevant program even when not supplied with electric power, allowing the program to be carried. The non-volatile recording medium 24 is not limited to the media mentioned above. Additionally, instead of the non-volatile recording medium 24, the program may be carried over the communication interface 27 and a communication network.

The volatile storage device 22 is computer-readable and can temporarily store data. The volatile storage device 22 is a memory such as a DRAM (dynamic random access memory) or an SRAM (static random access memory).

That is, the CPU 21, when executing a software program (computer program, hereinafter referred to simply as a "program") stored in the disk 23, copies the program to the volatile storage device 22 and executes computational processes. The CPU 21 reads data required to execute the program from the volatile storage device 22. When output results are required to be displayed, the CPU 21 displays the output results on the output device 26. When a program is input from an external source, such as another device that is communicably connected, the CPU 21 reads the program from the input device 25.

The CPU 21 interprets and executes a control program (FIG. 7, FIG. 8, FIG. 9, FIG. 10, or FIG. 12) in the volatile storage device 22 corresponding to the functions (processing) represented by the respective units illustrated in FIG. 2 or FIG. 11 described above. The CPU 21 executes the processes explained in the respective embodiments of the disclosure described above.

That is, in such cases, the respective embodiments of the disclosure can also be understood to be capable of being implemented by a relevant control program. Furthermore, the respective embodiments of the disclosure can also be understood to be capable of being implemented by means of a computer-readable non-volatile recording medium in which the relevant control program is recorded.

Additionally, the above-mentioned program may be for realizing just some of the functions described above. Furthermore, it may be capable of realizing the functions described above by being combined with a program already recorded in a computer system, i.e., it may be a so-called difference file (difference program).

The disclosure has been explained above with the embodiments described above as exemplary cases. However, the disclosure is not limited to the embodiments described above. That is, various modes that can be contemplated by a person skilled in the art may be applied to the disclosure within the scope of the disclosure.

REFERENCE SIGNS LIST

1 Control device
2 Control target
3 Image capture device
100 Control system
11 Information acquisition unit
12 State display unit
13 Image display unit
14 Control unit

What is claimed is:

1. A control device comprising:
at least one memory configured to store instructions; and
at least one processor configured to execute the instructions to:
display multiple state icons associated with multiple different states of a control target;
control the control target to transition among the multiple different states;
display in a second display area, based on a selection of one of the multiple state icons, a list of thumbnail images for multiple control targets in a state indicated by a selected state icon of the multiple state icons;
display in a first display area, based on a selection of one of the thumbnail images, an image relating to a control target corresponding to a selected thumbnail image among the multiple control targets in the state indicated by the selected state icon; and
transmit a control signal for controlling the state of the control target to the control target, based on a thumbnail image selected by an operation for selecting one of the thumbnail images in the list and a state icon selected by an operation for selecting one of the multiple state icons, so that the control target relating to the thumbnail image that is selected is put in the state represented by the state icon that is selected.

2. The control device according to claim 1, wherein the at least one processor is further configured to execute the instructions to:
transmit a state request signal to the multiple control targets, and receive state identifiers, each representing the state, from the multiple control targets; and
display in the second display area, based on the received state identifiers of the multiple control targets, the list of thumbnail images for the multiple control targets in the state indicated by the selected state icon, in response to the selection of one of the multiple state icons.

3. The control device according to claim 2, wherein the at least one processor is further configured to execute the instructions to:
display the multiple state icons corresponding to the states indicated by the state identifiers.

4. The control device according to claim 2, wherein the at least one processor is further configured to execute the instructions to:
count, based on the state identifiers of the multiple control targets received from the multiple control targets, a number of control targets for each of the state identifiers,
display in overlay, on each of the multiple state icons, the number of control targets in the state indicated by the state identifiers corresponding to the state icon.

5. The control device according to claim 1, wherein the at least one processor is further configured to execute the instructions to:
in response to a selection of one of the multiple state icons in a state in which the image relating to the control target corresponding to the selected thumbnail image from the list is displayed in the first display area, transmit a control signal for controlling the state of the control target to the control target so that the control target of the selected thumbnail image is put in the state represented by the selected state icon.

6. The control device according to claim 1, wherein the at least one processor is further configured to execute the instructions to:
in response to a selection of another state icon in a state in which the image relating to the control target corresponding to the one of the thumbnail images in the state indicated by the selected state icon is displayed, transmit a control signal for controlling the state of the control target to the control target so that the control target of the selected thumbnail image is put in the state represented by the another state icon.

7. A processing method comprising:
displaying multiple state icons associated with multiple different states of a control target, the control target being configured to transition among the multiple different states;
displaying in a second display area, based on a selection of one of the multiple state icons, a list of thumbnail images for multiple control targets in a state indicated by a selected state icon of the multiple state icons;
displaying in a first display area, based on a selection of one of the thumbnail images, an image relating to a control target corresponding to a selected thumbnail image among the multiple control targets in the state indicated by the selected state icon; and
transmitting a control signal for controlling the state of the control target to the control target, based on a thumbnail image selected by an operation for selecting one of the thumbnail images in the list and a state icon selected by an operation for selecting one of the multiple state icons, so that the control target relating to the thumbnail image that is selected is put in the state represented by the state icon that is selected.

8. A non-transitory storage medium that stores a program configured to cause a computer to perform processes, the processes comprising:
displaying multiple state icons associated with multiple different states of a control target, the control target being configured to transition among the multiple different states;

displaying in a second display area, based on a selection of one of the multiple state icons, a list of thumbnail images for multiple control targets in a state indicated by a selected state icon of the multiple state icons;

displaying in a first display area, based on a selection of one of the thumbnail images, an image relating to a control target corresponding to a selected thumbnail image among the multiple control targets in the state indicated by the selected state icon; and transmitting a control signal for controlling the state of the control target to the control target, based on a thumbnail image selected by an operation for selecting one of the thumbnail images in the list and a state icon selected by an operation for selecting one of the multiple state icons, so that the control target relating to the thumbnail image that is selected is put in the state represented by the state icon that is selected.

* * * * *